United States Patent [19]

Kanazawa et al.

[11] Patent Number: 4,733,878
[45] Date of Patent: Mar. 29, 1988

[54] FOUR-WHEEL STEERING SYSTEM FOR VEHICLE

[75] Inventors: Hirotaka Kanazawa; Masaki Watanabe; Shigeki Furutani; Yoshihiro Watanabe; Teruhiko Takatani; Shunsuke Kawasaki; Noritaka Yasuda; Akihiro Watanabe, all of Hiroshima, Japan

[73] Assignee: Mazda Motor Corporation, Japan

[21] Appl. No.: 874,687

[22] Filed: Jun. 16, 1986

[30] Foreign Application Priority Data

| Jun. 17, 1985 | [JP] | Japan | 60-131175 |
| Jun. 29, 1985 | [JP] | Japan | 60-143443 |
| Jul. 11, 1985 | [JP] | Japan | 60-152919 |
| Apr. 18, 1986 | [JP] | Japan | 61-90216 |

[51] Int. Cl.$^4$ ............................................. B62D 6/02
[52] U.S. Cl. ........................................................ 280/91
[58] Field of Search .................. 280/91; 180/132, 140, 180/141, 142; 188/299; 280/707

[56] References Cited

U.S. PATENT DOCUMENTS

| 4,274,091 | 6/1981 | Decker | 307/10 R |
| 4,313,514 | 2/1982 | Furukawa et al. | 280/91 |
| 4,408,673 | 10/1983 | Leiber | 180/141 |
| 4,418,780 | 12/1983 | Ito | 180/142 |
| 4,545,240 | 8/1985 | Leiber | 340/52 R |
| 4,582,159 | 4/1986 | Suzuki | 180/140 |
| 4,601,357 | 7/1986 | Miyoshi et al. | 180/141 |
| 4,603,316 | 7/1986 | Kobayashi et al. | 340/52 R |

FOREIGN PATENT DOCUMENTS

| 79754 | 6/1980 | Japan | 180/142 |
| 18005 | 2/1984 | Japan . | |
| 145666 | 8/1984 | Japan . | |
| 161255 | 8/1985 | Japan | 280/91 |
| 2148222 | 5/1985 | United Kingdom | 280/91 |

OTHER PUBLICATIONS

Zidosha Kogaku Zensho (Automobile Engineering Completion), vol. 12: Tire Brake, Jan. 1980.

*Primary Examiner*—John J. Love
*Assistant Examiner*—Karin L. Ferriter
*Attorney, Agent, or Firm*—Gerald J. Ferguson, Jr.; Michael P. Hoffman; Michael J. Foycik, Jr.

[57] ABSTRACT

A four-wheel steering system for a vehicle comprises a steering wheel, a front wheel turning mechanism for turning the front wheels in response to operation of the steering wheel, a rear wheel turning mechanism including a rear wheel steering ratio determining circuit for determining the rear wheel steering ratio and an actuator for turning the rear wheels according to the rear wheel steering ratio determined by the rear wheel steering ratio determining circuit. The four-wheel steering system is provided with a road condition sensor for detecting road surface conditions which can weaken the road gripping force of the wheels and a rear wheel steering ratio controller for changing the rear wheel steering ratio determined by the rear wheel steering ratio determining circuit so that the rear wheel steering ratio is increased when the road condition is such that the road gripping force of the wheels can be weakened.

22 Claims, 16 Drawing Figures

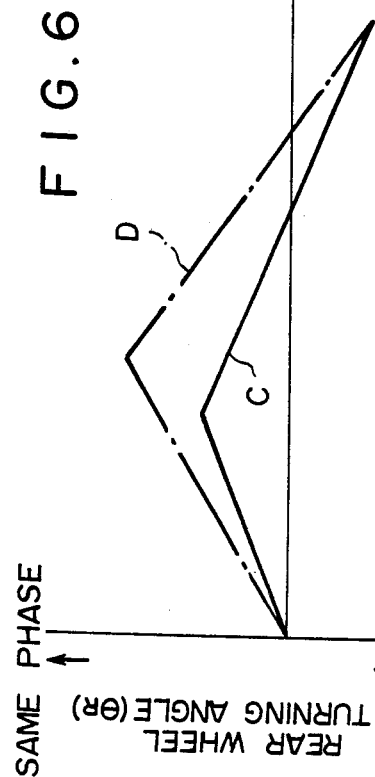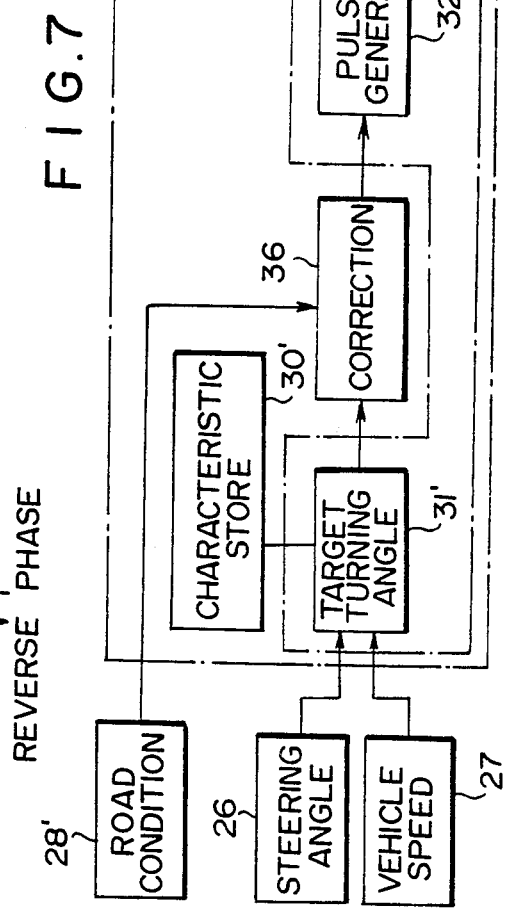

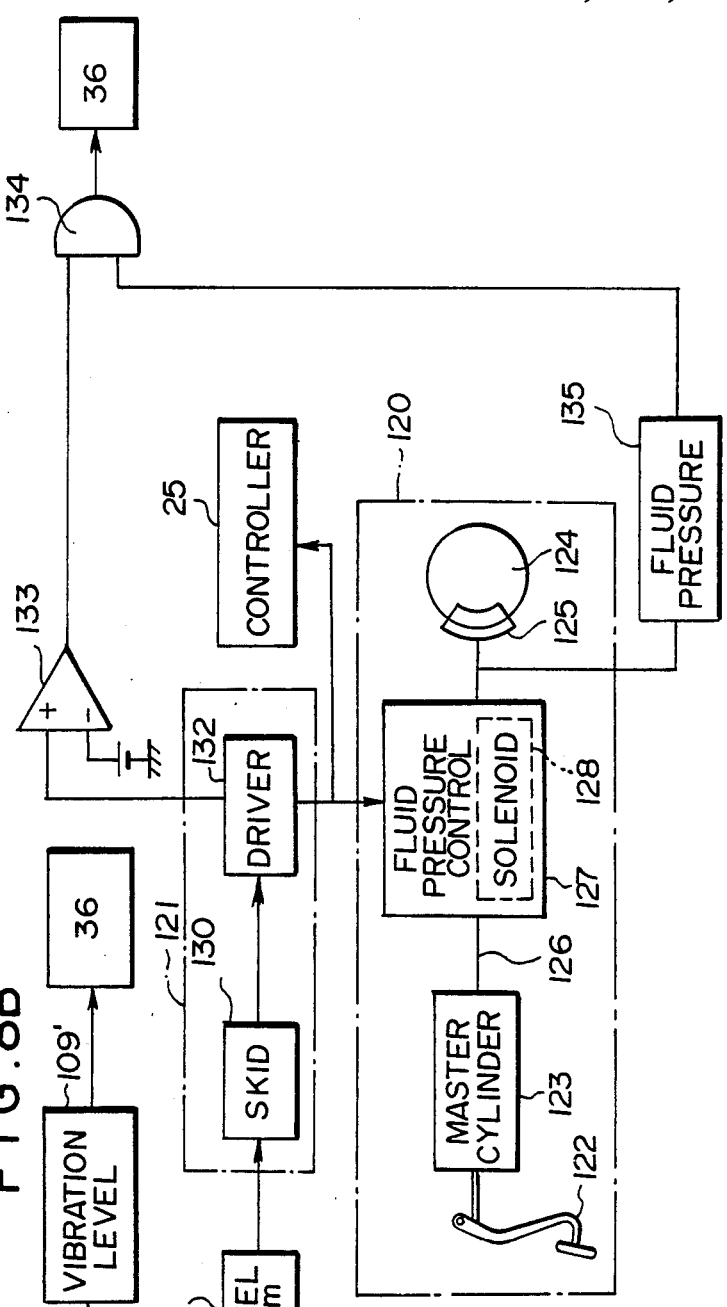

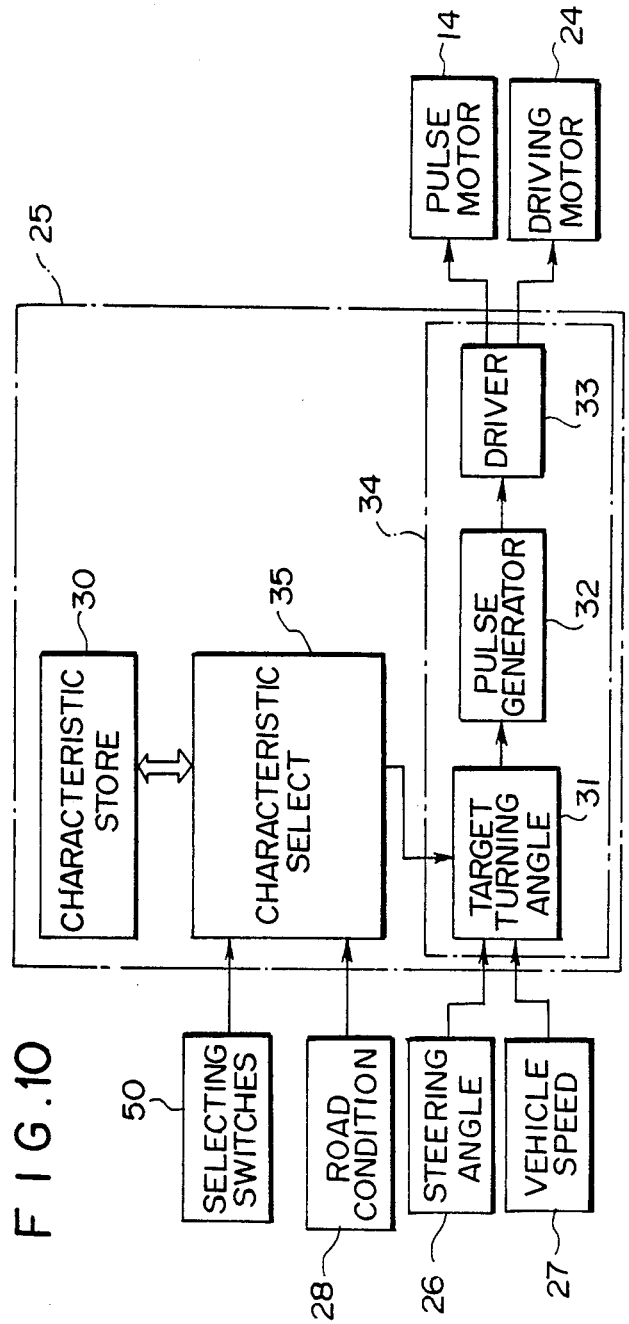
F I G. 10
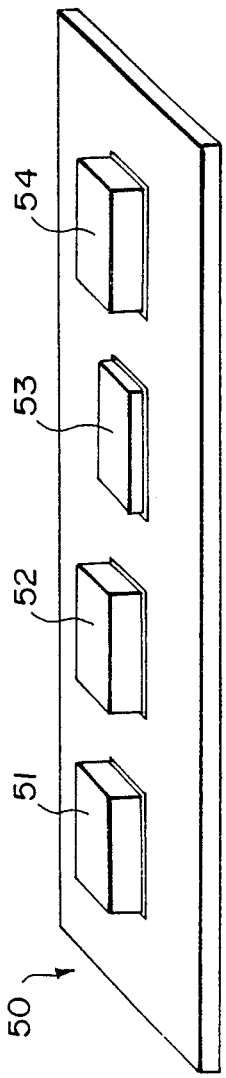
F I G. 11

FOUR-WHEEL STEERING SYSTEM FOR VEHICLE

BACKGROUND OF THE INVENTION

1. Field of the Invention

This invention relates to a four-wheel steering system for a vehicle in which both the front wheels and the rear wheels are turned in response to operation of the steering wheel.

2. Description of the Prior Art

There is disclosed, for example in U.S. Pat. No. 4,313,514, a four-wheel steering system for a vehicle in which both the front wheels and the rear wheels are turned in response to operation of the steering wheel, the ratio $\theta R/\theta F$ of the rear wheel turning angle $\theta R$ to the front wheel turning angle $\theta F$ (this ratio will hereinbelow be referred to as the "rear wheel steering ratio") being changed according to the vehicle speed and the front wheel turning ratio. Generally, the rear wheels are turned in the same direction as the front wheels (same phase) when the vehicle speed is relatively high and in the opposite direction to the front wheels (reverse phase) when the vehicle speed is lower than a predetermined value. By turning the front and rear wheels in the same phase, side slip of the wheels can be prevented during high speed travel, thereby improving running stability, and by turning the front and rear wheels in the reverse phase, the minimum turning radius of the vehicle can be reduced.

However, there is a problem in the four-wheel steering system that when the rear wheel steering ratio $\theta R/\theta F$ is fixed irrespective of the road condition, skidding of the wheels can occur irrespective of the vehicle speed. For example, when the road is wet with rain and the friction coefficient of the road is lowered, the road gripping force of the wheels is lowered and skidding of the wheels is apt to occur. The road gripping force of the wheels can also be lowered when the road surface is rough and the vehicle body vibrates up and down.

SUMMARY OF THE INVENTION

In view of the foregoing observations and description, the primary object of the present invention is to provide a four-wheel steering system for a vehicle in which the rear wheel steering ratio $\theta R/\theta F$ is changed according to the road condition so that skidding of the wheels does not occur even if the road gripping force is lowered.

The four-wheel steering system in accordance with the present invention comprises a steering member, a front wheel turning mechanism for turning the front wheels in response to operation of the steering member, a rear wheel turning mechanism including a rear wheel steering ratio determining means for determining the rear wheel steering ratio and an actuator for turning the rear wheels according to the rear wheel steering ratio determined by the rear wheel steering ratio determining means, and characterized by a road condition detecting means for detecting road surface conditions which can affect the road gripping force of the wheels and a rear wheel steering ratio changing means for changing the rear wheel steering ratio determined by the rear wheel steering ratio determining means so that the rear wheel steering ratio is increased when the road condition is such that the road gripping force of the wheels can be weakened.

In this specification, the rear wheel steering ratio is defined to be positive when the rear wheels are turned in the same direction as the front wheels (the same phase) and to be negative when the rear wheels are turned in the opposite direction to the front wheels (the reverse phase), and as the absolute value of the rear wheel steering ratio is increased, the rear wheels are turned by a larger angle for a given turning angle of the front wheels. Accordingly, to increase the rear wheel steering ratio in cases where the original rear wheel steering ratio (i.e., the value assumed if the road condition is not such that the road gripping force of the wheels may be weakened) is negative should be interpreted to reduce the absolute value of the ratio or to increase the ratio to a positive value.

By increasing the rear wheel steering ratio, the road gripping force of the wheels can be enhanced and the running stability can be improved.

BRIEF DESCRIPTION OF THE DRAWINGS

FIG. 6 is a graph showing characteristic curves representing another example of two rear wheel steering ratio characteristics which can be stored in the rear wheel steering ratio characteristic storing section 30 of the controller instead of those shown in FIG. 3, FIG. 7 is a view similar to FIG. 2 but showing the controller employed in a four-wheel steering system in accordance with another embodiment of the present invention, FIG. 8 is a view similar to FIG. 4 but showing some examples of the road condition sensor to be associated with the controller shown in FIG. 7, FIG. 10 is a view similar to FIG. 2 but showing the controller employed in a four-wheel steering system in accordance with still another embodiment of the present invention, FIG. 11 is a perspective view showing the selection means employed in the four-wheel steering system shown in FIG. 10.

DESCRIPTION OF THE PREFERRED EMBODIMENTS

Figure 1:
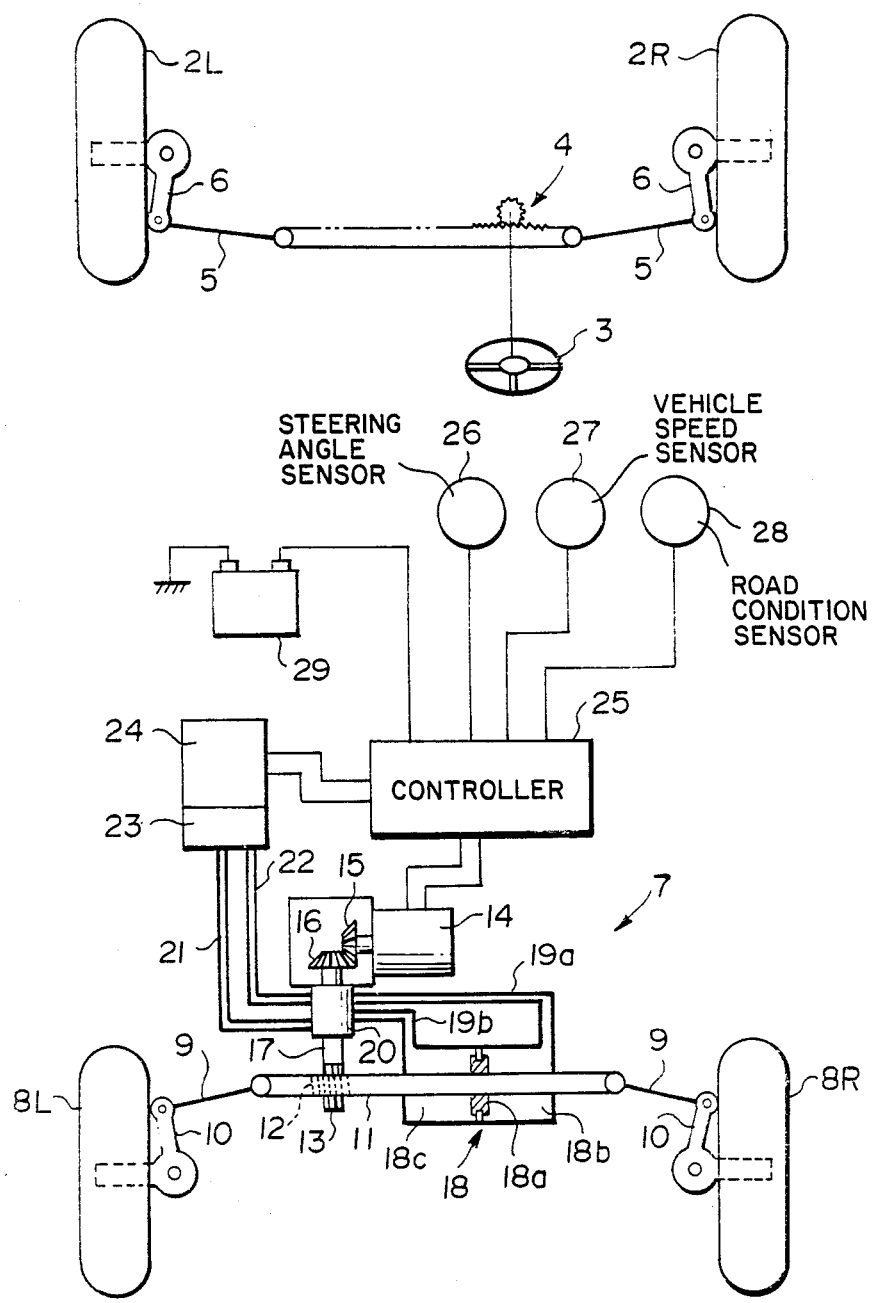
FIG. 1 is a schematic view showing a four-wheel steering system in accordance with an embodiment of the present invention.

In FIG. 1, a four-wheel steering system in accordance with an embodiment of the present invention includes a front wheel turning mechanism 1 for turning left and right front wheels 2L and 2R and a rear wheel turning mechanism 7 for turning left and right rear wheels 8L and 8R. The front wheel turning mechanism 1 comprises a steering wheel 3, a rack-and-pinion mechanism 4 for converting a rotational movement of the steering wheel 3 into a linear movement, left and right tie rods 5 and left and right knuckle arms 6. The rear wheel turning mechanism 7 includes a rear wheel control rod 11 connected to the left and right rear wheels 8L and 8R by way of left and right tie rods 9 and left and right knuckle arms 10 at the left and right ends. The rear wheel control rod 11 is provided with a rack 12 and a pinion 13 is in mesh with the rack 12. The pinion 13 is formed on one end of a pinion shaft 17 and a bevel gear 16 is provided on the other end of the pinion shaft 17. The bevel gear 16 is in mesh with a bevel gear 15 driven by a pulse motor 14. Thus, the rear wheel control rod 11 is moved right and left by the pulse motor 14 to turn the rear wheels 8L and 8R.

A power cylinder 18 is operatively connected to the rear wheel control rod 11. That is, a piston 18a is fixed to the rear wheel control rod 11 which is received in the power cylinder 18 to divide the interior of the power cylinder 18 into right and left hydraulic pressure chambers 18b and 18c. The right and left hydraulic pressure chambers 18b and 18c are communicated with a control valve 20 respectively by way of hydraulic passages 19a and 19b. The control valve 20 is connected to an oil pump 23 by way of an oil feed passage 21 and an oil return passage 22. The oil pump 23 is driven by an electric motor 24. The control valve 20 detects the rotational direction of the pinion shaft 17, and connects the right and left hydraulic pressure chambers 18b and 18c to the oil feed passage 21 and the oil return passage 22 according to the rotational direction of the pinion shaft 17 to assist in moving the rear wheel control rod 11. That is, when the pinion shaft 17 is rotated to turn left the rear wheels 8L and 8R, the control valve 20 connects the oil feed passage 22 to the right hydraulic pressure chamber 18b and the oil return passage 22 to the left hydraulic pressure chamber 18c, and when the pinion shaft 17 is rotated to turn right the rear wheels 8L and 8R, the control valve 20 connects the oil feed passage 22 to the left hydraulic pressure chamber 18c and the oil return passage 22 to the right hydraulic pressure chamber 18b. At the same time, the control valve 20 reduces the oil pressure from the oil pump 23 according to the rotating force of the pinion shaft 17.

The pulse motor 14 and the electric motor 24 for driving the oil pump 23 are controlled by control signals output from a controller 25. To the controller 25 are input a steering angle signal from a steering angle sensor 26 for detecting the turning angle of the front wheels 2L and 2R through a turning angle of the steering wheel 3, for example, a vehicle speed signal from a vehicle speed sensor 27 and a road condition signal from a road condition sensor 28 for detecting conditions of the road surface which can affect the road gripping force of the wheels. Further, a battery 29 is connected to the controller 25.

Figure 2:
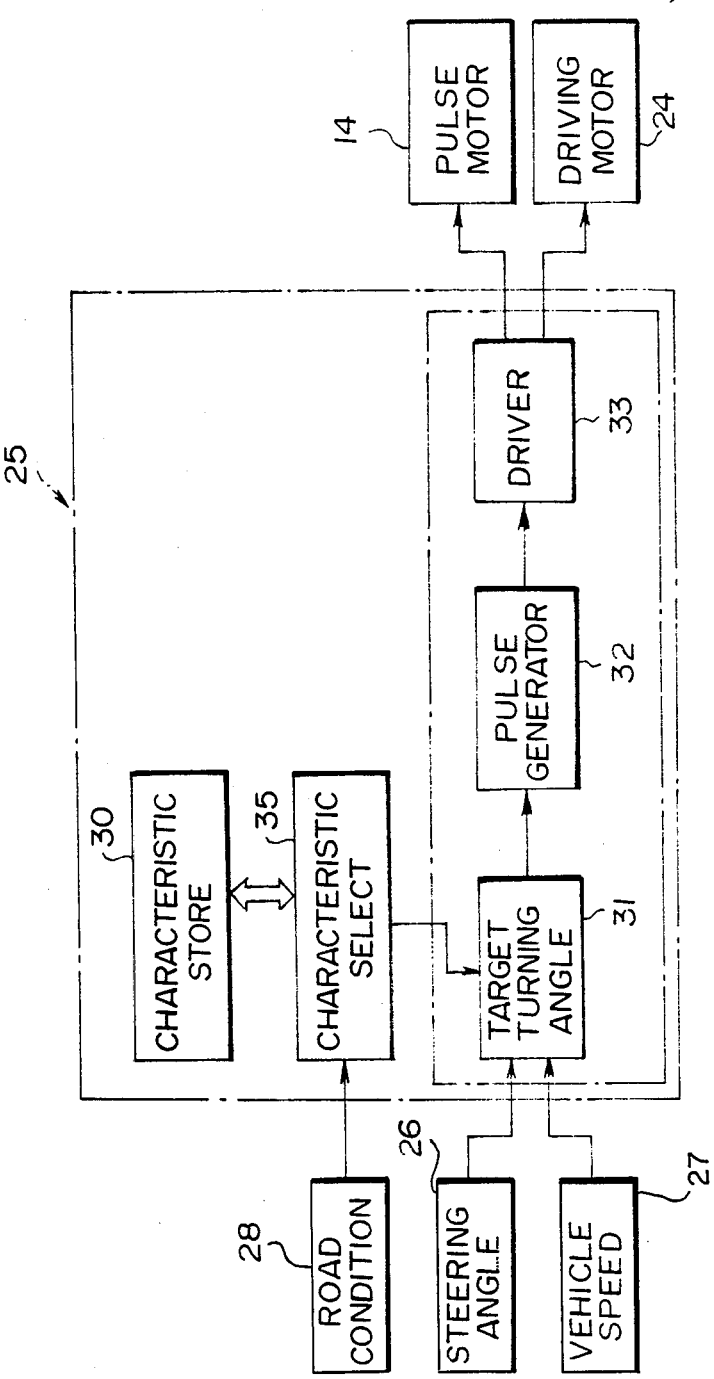
FIG. 2 is a block diagram showing the controller employed in the four-wheel steering system shown in FIG. 1.
Figure 3:
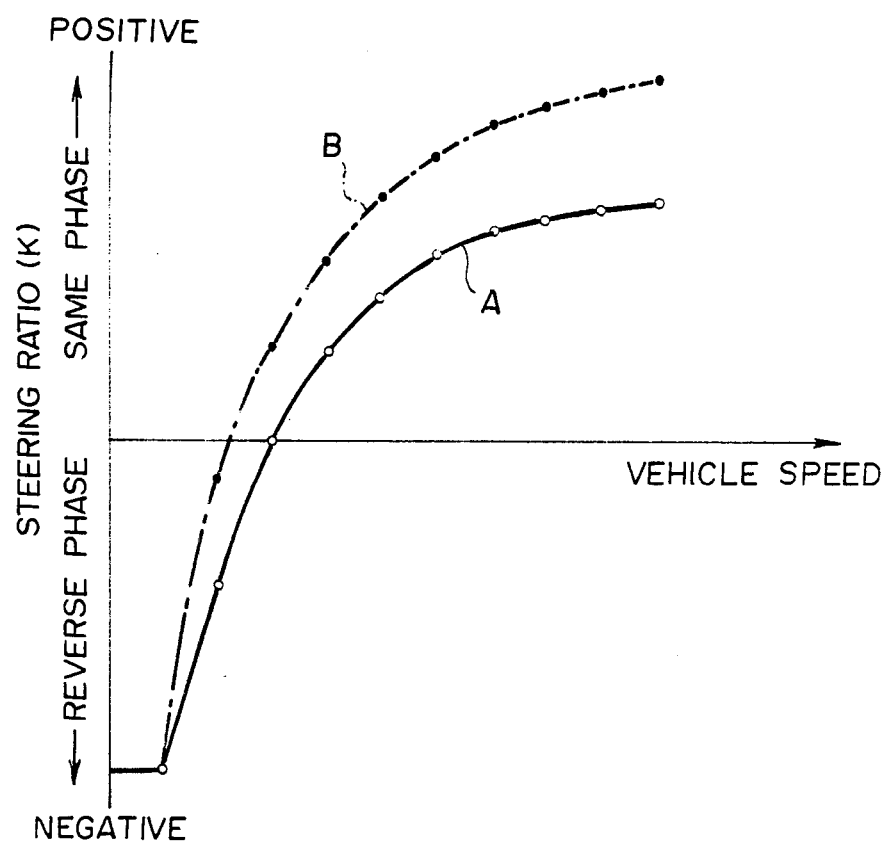
FIG. 3 is a graph showing characteristic curves representing two rear wheel steering ratio characteristics stored in the rear wheel steering ratio characteristic storing section 30 of the controller.

As shown in FIG. 2, the controller 25 includes a rear wheel steering ratio characteristic storing section 30 and a characteristic selecting section 35. A rear wheel steering ratio characteristic for the normal road condition shown by curve A in FIG. 3 and as exemplified by U.S. Pat. No. 4,418,780 granted Dec. 6, 1983 and a rear wheel steering ratio characteristic for the road conditions which can affect the road gripping force of the wheels (such a road condition will hereinbelow be referred to as "abnormal road condition") shown by curve B in FIG. 3 are stored in the rear wheel steering ratio characteristic storing section 30. In accordance with the road condition signal from the road condition sensor 28, the characteristic selecting section 35 selects one of the rear wheel steering ratio characteristics stored in the rear wheel steering ratio characteristic storing section 30 and sends a selection signal representing the selected rear wheel steering ratio characteristic to a target rear wheel turning angle calculating section 31. In both the rear wheel steering ratio characteristic curves A and B, when the vehicle speed is low, the rear wheel steering ratio k is negative, that is, the rear wheels are turned in the opposite direction to the front wheels, and as the vehicle speed is increased, the rear wheel steering ratio k is increased to turn positive (that is, the rear wheels are turned in the same direction as the front wheels) at an intermediate vehicle speed. However, in the curve B for the abnormal road condition, the rear wheel steering ratio k for a given vehicle speed is larger than that in the curve A for the normal road condition over the entire vehicle speed range.

The target rear wheel turning angle calculating section 31 receives the steering angle signal from the steering angle sensor 26 and the vehicle speed signal from the vehicle speed sensor 27, and calculates a target rear wheel turning angle according to the turning angle of the front wheels and the vehicle speed based on the rear wheel steering ratio characteristic selected by the characteristic selecting section 35. The target rear wheel turning angle calculated by the target rear wheel turning angle calculating section 31 is delivered to a pulse generator 32. The pulse generator 32 delivers a pulse signal corresponding to the target rear wheel turning angle to a driver 33. The driver 33 converts the pulse signal into a driving pulse signal for driving the pulse motor 14 and the electric motor 24 for driving the oil pump 23 and sends it to the motors 14 and 24.

Thus, in the four-wheel steering system of this embodiment, the rear wheels 8L and 8R are turned in accordance with the characteristic curve B shown in FIG. 3 when the abnormal road condition is detected and otherwise in accordance with the characteristic curve A.

Now, the road condition sensor 28 will be described in detail with reference to FIGS. 4A to 4E.

Figure 4A:
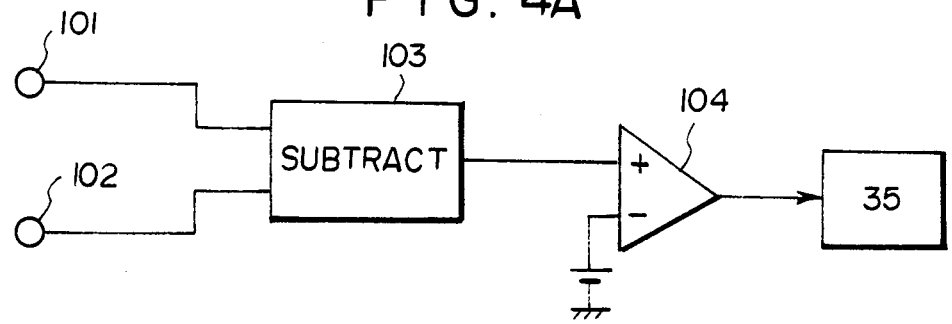
FIGS. 4A to 4E are views schematically showing several examples of the road condition sensor.

The road condition sensor 28 may be in various forms. For example, the road condition sensor 28 may be arranged to detect the friction coefficient of the road surface through the difference in rpm between the driving wheels and the driven wheels as shown in FIG. 4A. In FIG. 4A, the road condition sensor 28 comprises a first rpm meter 101 for detecting the rpm of the driving wheels, the front wheels in this particular embodiment, and a second rpm meter 102 for detecting the rpm of the driven wheels, the rear wheels in this particular embodiment. The difference between the rpm of the driving wheels and the rpm of the driven wheels is calculated by a subtractor 103 and the difference therebetween is compared with a reference level by a comparator 104. When the difference is larger than the reference level, the comparator 104 delivers an abnormal road condition detecting signal to the characteristic selecting section 35.

Figure 4B:
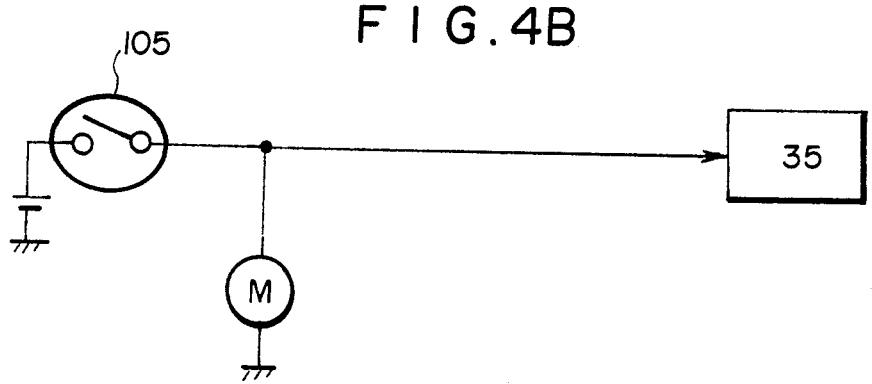

The sensor 28 may be simply a windscreen wiper switch 105 as shown in FIG. 4B. That is, when the wiper is operated, it may be considered that the road surface is wet with rain and it may be determined that the rear wheel steering ratio characteristic for the abnormal road condition should be selected. In cases where the wiping speed is variable, the sensor 28 may be arranged so that only the abnormal road condition detecting signal is sent to the characteristic selecting section 35 when a wiping speed higher than a predetermined speed is selected. For example, in the case that the wiping speed can be varied to three speeds, "intermittent", "low", and "high", the abnormal road condition signal may be sent to the characteristic selecting section 35 when the wiping speed is "low" or "high".

Figure 4C:
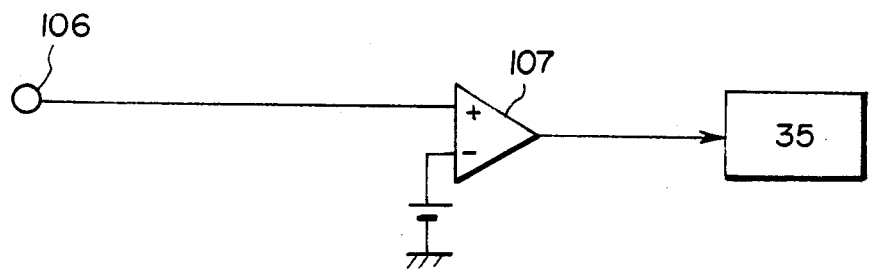

Further, the sensor 28 may comprise a temperature sensor 106 for detecting the ambient temperature as shown in FIG. 4C. In this case, the ambient temperature is compared with a reference temperature (typically 020 C.) by a comparator 107 and the sensor 28 outputs the abnormal road condition detecting signal when the former is lower than the latter, that is, when the road is freezing.

Figure 4D:
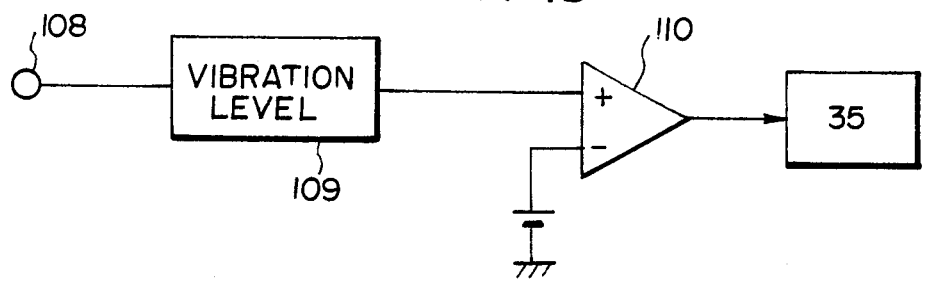

As described above, up-and-down vibration of the vehicle body can weaken the road gripping force of the wheels, and accordingly the sensor 28 may comprise a vibration sensor 108 as shown in FIG. 4D. In FIG. 4D, the output of the vibration sensor 108 is input into a vibration level determiner 109. The output of the vibration level determiner 109 is compared with a reference vibration level by a comparator 110, and when the former is higher than the latter, the abnormal road condition detecting signal is sent to the characteristic selecting section 35.

Figure 4E:
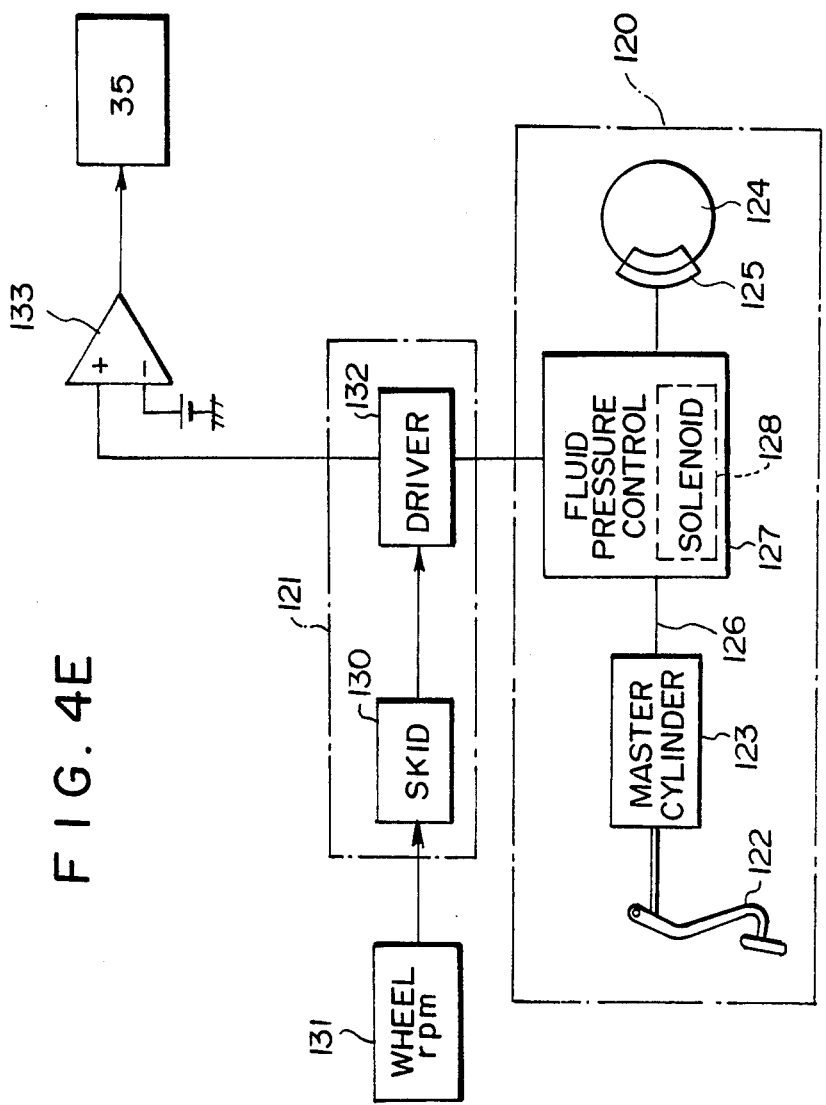

In the case of a vehicle provided with an anti-skid brake system 120, an anti-skid brake controller 121 can be used as the road condition sensor 28 as shown in FIG. 4E. In FIG. 4E, the anti-skid brake system 120 includes a brake pedal 122, a master cylinder 123 associated with the brake pedal 122, disk brakes 124 each having a brake pad 125 connected with the master cylinder 123 by way of a pressure line 126, and a pressure control section 127 provided in the pressure line 126. The pressure control section 127 is provided with a solenoid 128 for controlling the brake fluid pressure to be transmitted to the brake pad 125. The solenoid 128 is controlled by the anti-skid brake controller 121. The anti-skid brake controller 121 comprises a skid detecting circuit 130 which detects the skidding of the wheels through the output of a wheel rpm sensor 131, and a driver 132 which receives the output of the skid detecting circuit 130 and generates a driving pulse for driving the solenoid 128 according to the rotating condition of the wheels.

The operation of the anti-skid brake controller 121 will hereinbelow be described in detail with reference to FIG. 5.

Figure 5:
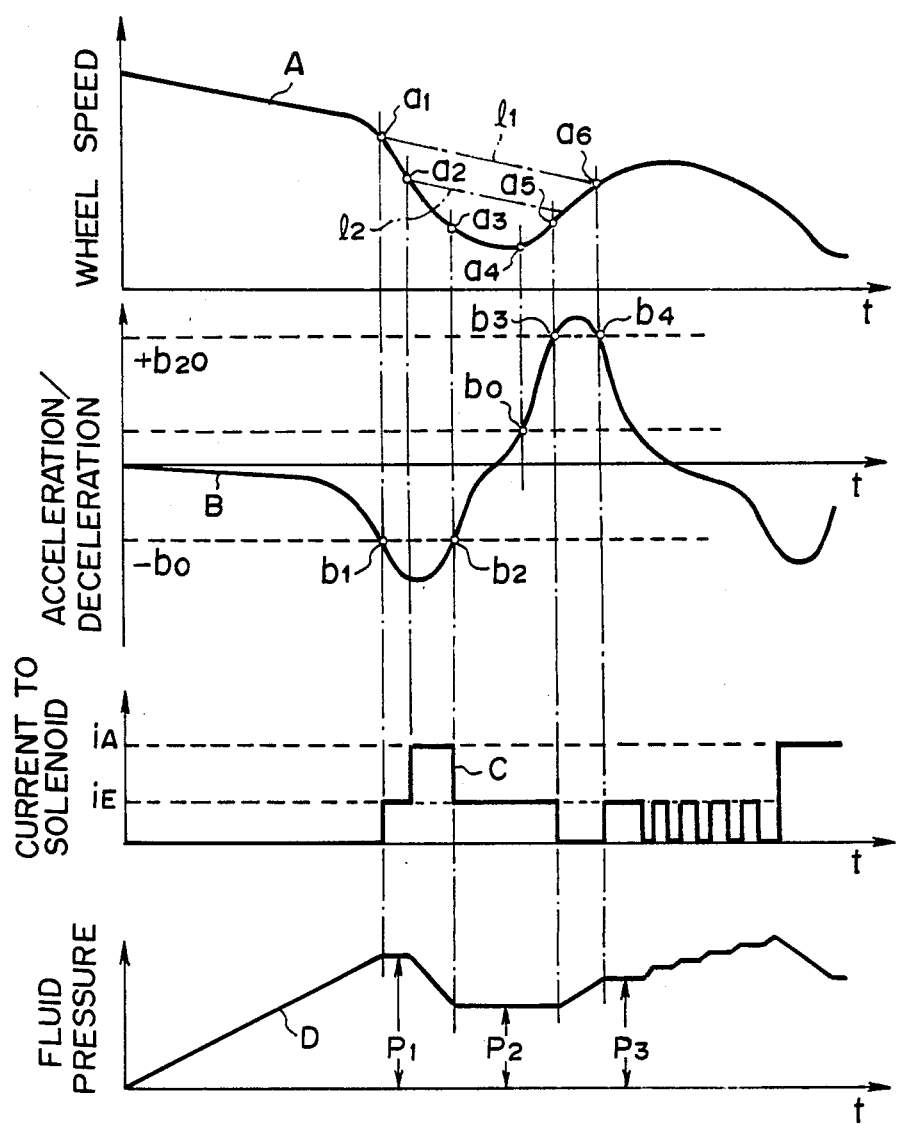
FIG. 5 is a view for illustrating the operation of the circuit shown in FIG. 4E.

When the brake pedal 122 is depressed, brake fluid pressure is increased as shown by line D in FIG. 5, and as the brake fluid pressure increases, the rotational speed of the wheels changes as shown by line A and deceleration/acceleration of the rotational speed of the wheels changes as shown by line B. When the deceleration of the rotational speed of the wheels is not larger than a predetermined reference value, the road gripping force of the wheels may be considered to be sufficient. On the other hand, when the rotational speed of the wheels is abruptly reduced so that the deceleration thereof is larger than the reference value, the road gripping force of the wheels may be considered to be weakened.

More particularly, when the deceleration of the rotational speed of the wheels is increased to reach a first reference value, $-b_0$, at point $b_0$ on line B in FIG. 5, the rotational speed of the wheels is abruptly reduced from point $a_1$ on line A to cause skid of the wheels. In this case, an electric current of $i_E$ is supplied to the solenoid 128 from the driver 132 of the anti-skid controller 121 as shown by line C to hold the brake fluid pressure at a predetermined value $P_1$ as shown by the line D. When the rotational speed of the wheels is further reduced to a predetermined value corresponding to point $a_2$ on the line A, the electric current supplied to the solenoid 128 is increased to $i_4$ to lower the brake fluid pressure to a predetermined value $P_2$. When the deceleration of the rotational speed of the wheels is thereby reduced and returns to the first reference value $-b_0$ at point $b_2$, the electric current supplied to the solenoid 128 is reduced to hold the brake fluid pressure at the predetermined value $P_2$. With the brake fluid pressure held at the predetermined value $P_2$, the deceleration of the rotational speed of the wheels is gradually reduced and becomes 0 at point $b_0$. (The acceleration of the same is also 0 at the point $b_0$.) Thereafter, the rotational speed of the wheels is increased with the increase in the acceleration thereof. When the acceleration subsequently reaches a second reference value $+b_{20}$ at point $b_3$ on the line A, supply of the electric current to the solenoid 128 is terminated, whereby the brake fluid pressure is again increased. The acceleration of the rotational speed of the wheels is thereby reduced, and when the acceleration returns to the second reference value $+b_{20}$ at point $b_4$, an electric current of $i_E$ is again supplied to the solenoid 128 to hold the brake fluid pressure at a predetermined value $P_3$, thereby preventing skidding of the wheels. As can be understood from the description above, the more the road gripping force of the wheels is weakened, the more frequently the driver 132 outputs. The output frequency of the driver 132 is input into a comparator 133 and when the output frequency is higher than a predetermined reference value, the abnormal road condition detecting signal is sent to the characteristic selecting section 35.

Thus, in the first embodiment of the present invention described above, when the road gripping force of the wheels is weakened, the rear wheel steering ratio is increased to prevent skidding of the wheels.

Though being changed according to the vehicle speed in the first embodiment, the rear wheel steering ratio may be changed according to the front wheel turning angle $\theta F$ as shown in FIG. 6, line C being for the normal road condition and line D being for the abnormal road condition. In this case, the rear wheel steering ratio is controlled based on the fact that the front wheel turning angle is small when the vehicle speed is high and large when the vehicle speed is low, and the characteristic curves C and D are substantially the same as the curves A and B in FIG. 3, respectively. Further, in the case that the rear wheel turning angle $\theta R$ is controlled according to the curves C or D, the vehicle speed sensor can be eliminated.

FIG. 7 shows a controller which is employed in a four-wheel steering system in accordance with another embodiment of the present invention. The four-wheel steering system of this embodiment is substantially the same as the system shown in FIG. 1 except for the controller, and accordingly only the controller will be described here. As shown in FIG. 7, the controller 25' in this embodiment comprises a rear wheel steering ratio characteristic storing section 30', a target rear wheel turning angle calculating section 31', a correcting section 36, a pulse generator 32' and a driver 33'. Only a rear wheel steering ratio characteristic for the normal road condition such as shown by the curve A in FIG. 3 is stored in the rear wheel steering ratio characteristic storing section 30'. The target rear wheel turning angle calculating section 31' calculates a target rear wheel turning angle according to the turning angle of the front wheels input from the steering angle sensor 26 and the vehicle speed input from the vehicle speed sensor 27 based on the rear wheel steering ratio characteristic stored in the rear wheel steering ratio characteristic storing section 31'. The target rear wheel turning angle thus calculated is corrected by the correcting section 36 according to a road condition signal input into the correcting section from a road condition sensor 28'. Then the corrected value of the target rear wheel turning angle is input into the pulse generator 32'. In this embodiment, the circuits shown in FIGS. 8A to 8C are employed as the road condition sensor 28'. The circuits shown in FIGS. 8A to 8C are respectively similar to those shown in FIGS. 4A, 4D and 4E, but a variable value is input into the correcting section 36 in each circuit. That is, in the circuit shown in FIG. 8A, a subtractor 103' directly delivers, to the correcting section 36, the difference between the output of a rpm meter 101' for detecting the rpm of the driving wheels and the output of a rpm meter 102' for detecting the rpm of the driven wheels. Similarly, in the circuit shown in FIG. 8B, the output of the vibration sensor 108' is input into a vibration level determiner 109', and the output of the vibration level determiner 109' is directly input into the correcting section 36. In the circuit shown in FIG. 8C, the output of the comparator 133 for comparing the output frequency of the driver 132 with a reference value is input into an AND circuit 134. The output of a brake fluid pressure sensor 135 is also input into the AND circuit 134. That is, in this circuit, when the output frequency of the driver 132 is larger than the reference value, the output of the brake fluid pressure sensor 135 is input into the correcting circuit 36.

The correcting circuit 36 receives the output of the road condition sensor 28' and adds, to the target rear wheel turning angle calculated by the target rear wheel turning angle calculating section 31', a correction turning angle which is positive and the value of which varies depending on the value of the output of the abnormal road condition sensor 28', that is, the degree of reduction in the road gripping force of the wheels. The foregoing may be effected by determining the cornering power for the front and rear wheel tires from the coeficient of friction measured by either the circuitry of FIG. 8A or 8C, the relationship between the cornering power and the coefficient of friction being known, see, for example, Zidosha Kogaku Zensho (Automobile Engineering Completion) Vol. 12: Tire, Brake, 1980, page 53, FIG. 4.19. The thus determined cornering powers for the front and rear tires may then be employed in Equation 2 of the aforementioned U.S. Pat. No. 4,418,780 to determine a rear wheel steering ratio characteristic for abnormal road conditions corresponding to curve B of FIG. 3.

In this embodiment, the rear wheel steering ratio characteristic can be controlled more finely than in the embodiment shown in FIG. 1, whereby the running stability can be more improved.

Figure 9:
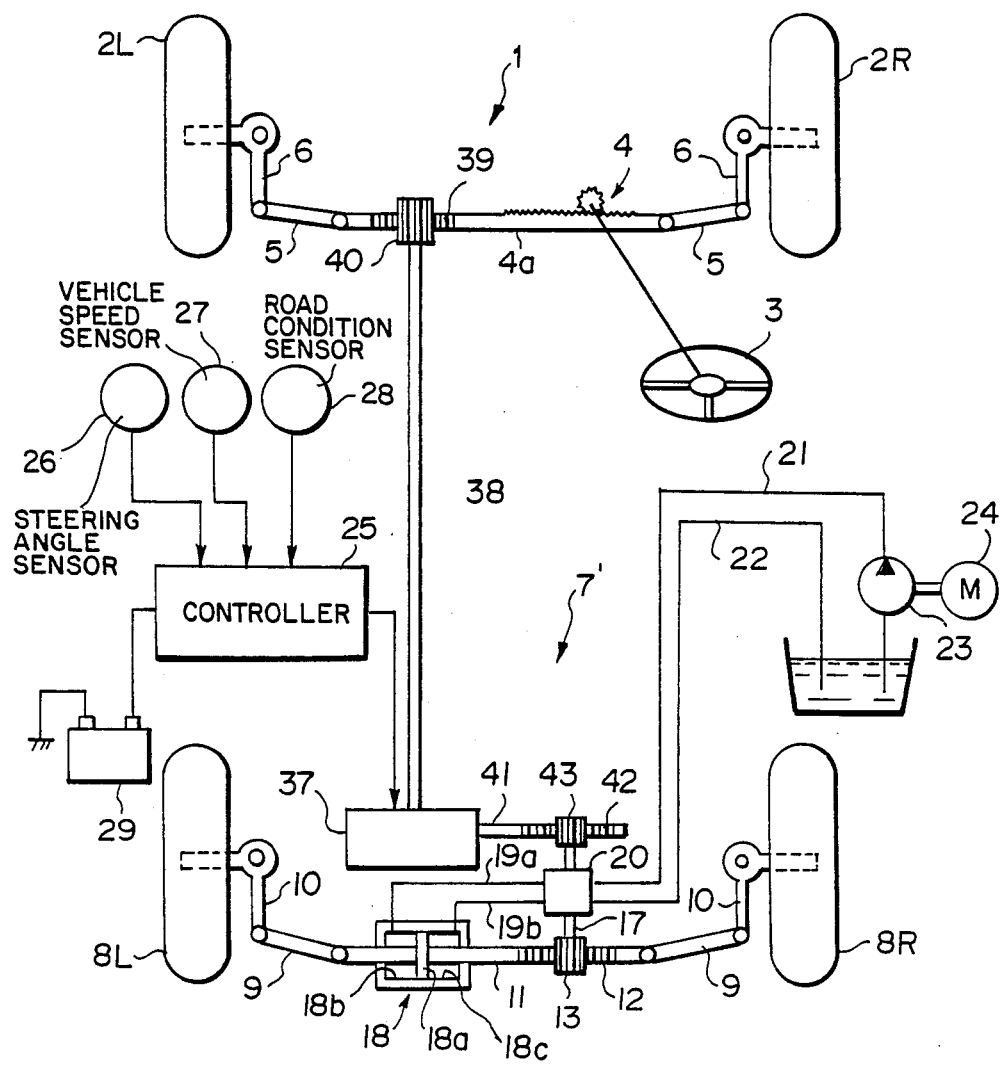
FIG. 9 is a view similar to FIG. 1 but showing a modification of the four-wheel steering system of FIG. 1.

FIG. 9 shows a modification of the four-wheel steering system shown in FIG. 1. In FIG. 9, the parts analogous to the parts shown in FIG. 1 are given the same reference numerals and will not be described in detail here. In this modification, the rear wheel turning mechanism is mechanically connected with the front wheel turning mechanism unlike in the system shown in FIG. 1 in which the rear wheel turning force is provided by the pulse motor 14. That is, the rear wheel turning mechanism 7' in this modification includes a connecting rod 38 having a pinion 40 on the front end thereof and the pinion 40 is in mesh with an additional rack 39 formed on the shaft 4a on which the rack of the rack-and-pinion mechanism 4 of the front wheel turning mechanism 1 is provided. Accordingly, the connecting rod 38 is rotated in response to operation of the steering wheel 3. The connecting rod 38 is connected with a sliding member 41 by way of a rear wheel steering ratio changing device 37. The sliding member 41 is provided with a rack 42 in mesh with a pinion 43 provided on the pinion shaft 17 instead of the bevel gear 16 in the rear wheel turning mechanism 7 of the system shown in FIG. 1. The rotation of the pinion shaft 17 is transmitted to the rear wheel control rod 11 to turn the left and right rear wheels 8L and 8R by way of the same system as in the rear wheel turning mechanism 7 shown in FIG. 1. The rear wheel steering ratio changing device 37 changes the amount of sliding movement of the sliding member 41 for a given rotation of the connecting rod 38 under the control of the controller 25, and a typical example of the rear wheel steering ratio changing device 37 is disclosed in our U.S. Pat. No. 4,573,316. The controller 25 controls the rear wheel steering ratio changing device 37 to obtain the same effect as in the embodiment described above.

Figure 12:
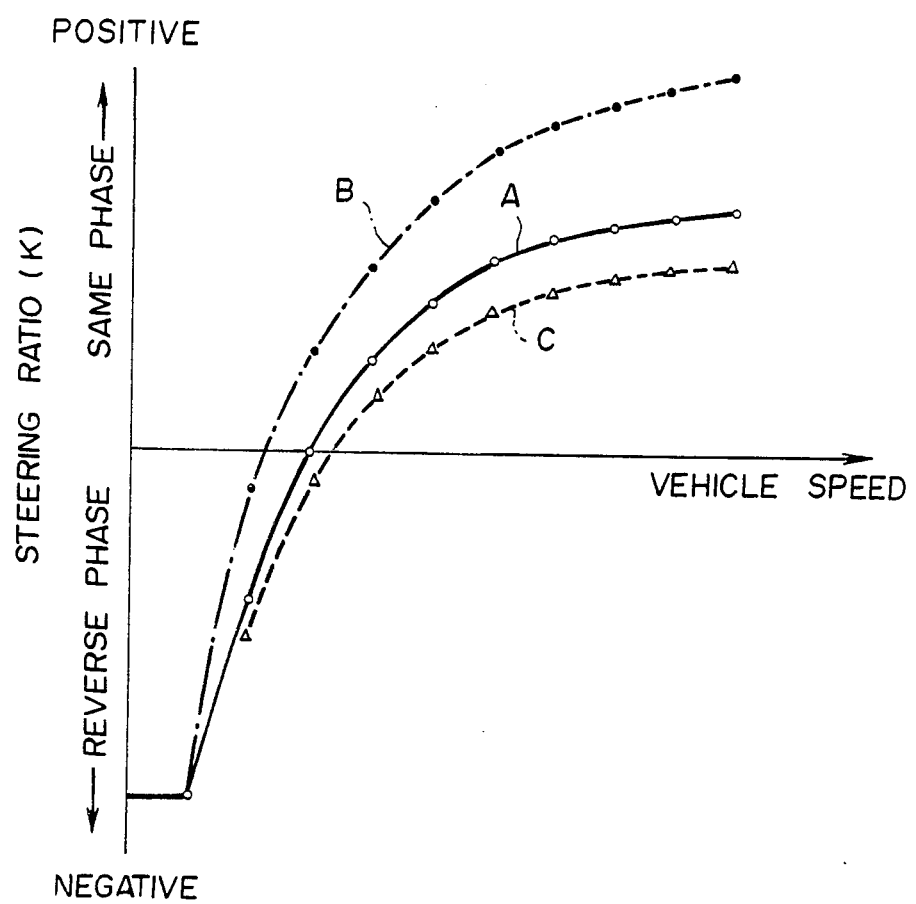
FIG. 12 is a graph showing characteristic curves representing rear wheel steering ratio characteristics stored in the rear wheel steering ratio characteristic storing section 30 of the controller shown in FIG. 10.

Still another embodiment of the present invention will be described hereinbelow with reference to FIGS. 10 to 12.

The four-wheel steering system of this embodiment is mechanically substantially the same as the system of the embodiment described above in conjunction with FIGS. 1 to 6, and accordingly, the parts in FIGS. 10 to 12 analogous to the parts shown in FIGS. 1 to 6 are given the same reference numerals and only the difference between the two embodiments will be described here. In this embodiment, three rear wheel steering ratio characteristics represented by curves A, B and C in FIG. 12 are stored in the rear wheel steering ratio characteristic storing section 30, and a selection means 50 having four selecting switches 51 to 54 is provided. The output of the selection means 50 is input into the characteristic selecting section 35 together with the output of the road condition sensor 28. The selecting switches 52 to 54 are for setting the rear wheel steering ratio characteristic to one of the characteristics represented by the curves A, B and C. For example, when the second selecting switch is depressed, the rear wheel steering ratio is controlled in accordance with the characteristic represented by the curve A irrespective of the road condition. When the third selecting switch 53 is depressed as shown in FIG. 11, the rear wheel steering ratio characteristic is set to that represented by the curve B, and so on. On the other hand, when the first selecting switch 51 is depressed, one of the three rear wheel steering ratio characteristics is automatically selected according to the road condition in a manner similar to that described above.

We claim:

1. A four-wheel steering system for a vehicle comprising a steering member, a front wheel turning mechanism for turning the front wheels in response to operation of the steering member, a rear wheel turning mechanism including means for sensing a vehicle condition and a rear wheel steering ratio determining means for determining the rear wheel steering ratio which is the ratio of the turning angle of the rear wheels to the turning angle of the front wheels where the steering ratio determining means has at least a predetermined first rear wheel steering ratio characteristic as a function of said vehicle condition and a second rear wheel steering ratio characteristic as a function of said vehicle condition which is shifted in an algebraically positive direction as compared with the first rear wheel steering ratio characteristic, and an actuator for turning the rear wheels according to the sensed vehicle condition and the rear wheel steering ratio determined by the rear wheel steering ratio determining means, characterized by a road condition detecting means for detecting conditions of the road surface which can affect the road gripping force of the wheels and a rear wheel steering ratio selecting means which receives an output of the road condition detecting means and outputs the first rear wheel steering ratio characteristic to the actuator when the detected road condition is such that the road gripping force of the wheels is high and the outputs the second rear steering ratio characteristic to the actuator when the detected road condition is such that the road gripping force of the wheels may be weakened.

2. A four-wheel steering system for a vehicle as defined in claim 1 in which said road condition detecting means detects the friction coefficient of the road surface.

3. A four-wheel steering system for a vehicle as defined in claim 2 in which said road condition detecting means comprises means for detecting the difference between the rpm of the driving wheels and the rpm of the driven wheels, and determines that the friction coefficient of the road surface is low when the difference therebetween is larger than a predetermined value.

4. A four-wheel steering system for a vehicle as defined in claim 2 in which said road condition detecting means comprises means for detecting whether the road surface is wet, and determines that the friction coefficient of the road surface is low when the road surface is wet.

5. A four-wheel steering system for a vehicle as defined in claim 4 in which said road condition detecting means is associated with a windshield wiper switch.

6. A four-wheel steering system for a vehicle as defined in claim 2 in which said road condition detecting means comprises means for detecting roughness of the road, and the friction coefficient of the road surface is determined as being lower as the roughness of the road becomes larger.

7. A four-wheel steering system for a vehicle as defined in claim 6 in which said road condition detecting means comprises a vibration sensor for detecting up-and-down vibration of the vehicle body.

8. A four-wheel steering system for a vehicle as defined in claim 2 in which the vehicle further comprises an anti-skid brake system and said road condition detecting means comprises means for detecting an operating signal of the anti-skid brake system and determines that the friction coefficient of the road surface is low when the anti-skid brake system is operated.

9. A four-wheel steering system for a vehicle as defined in claim 2 in which said road condition detecting means further comprises a pressure sensor for detecting the brake fluid pressure and detects the friction coefficient of the road surface through the brake fluid pressure and the operating signal of an anti-skid brake system.

10. A four-wheel steering system for a vehicle as defined in claim 2 in which said road condition detecting means comprises means for detecting whether the road surface is freezing and determines that the friction coefficient of the road surface is low when the road surface is freezing.

11. A four-wheel steering system for a vehicle as defined in claim 10 in which the road condition detecting means comprises a temperature sensor for detecting the ambient temperature.

12. A four-wheel steering system for a vehicle as defined in claim 1 in which the rear wheel steering ratio as determined by the rear wheel steering ratio determining means is changed with the vehicle speed to be larger as the vehicle speed increases.

13. A four-wheel steering system for a vehicle as defined in claim 1 in which the rear wheel steering ratio as determined by the rear wheel steering ratio determining means is changed with the front wheel turning angle to be smaller as the front wheel turning angle increases.

14. A four-wheel steering system for a vehicle as defined in claim 1 in which said means for sensing a vehicle condition senses vehicle speed and wherein said rear wheel turning mechanism further comprises a steering angle sensor and a controller including a calculating section for calculating a target turning angle of the rear wheels according to the outputs of the steering angle sensor and the vehicle speed sensor.

15. A four-wheel steering system for a vehicle as defined in claim 14 in which said controller further includes a rear wheel steering ratio characteristic storing section for storing at least one rear wheel steering ratio characteristic.

16. A four-wheel steering system for a vehicle as defined in claim 15 in which a plurality of rear wheel steering ratio characteristics are stored in the rear wheel steering ratio characteristic storing section and said controller further includes a characteristic selecting section for selecting one of the rear wheel steering ratio characteristics according to the detecting signal of said road condition detecting means.

17. A four-wheel steering system for a vehicle as defined in claim 15 in which said controller further comprises a correcting section for correcting the output of the calculating section according to the detecting signal of the road condition detecting means.

18. A four-wheel steering system for a vehicle as defined in claim 1 further comprising a canceling means for canceling the function of the rear wheel steering ratio changing means.

19. A four-wheel steering system for a vehicle as defined in claim 18 in which said canceling means comprises a manually operated changeover switching means.

20. A four-wheel steering system for a vehicle as defined in claim 19 in which by operating the manually operated changeover switching means, the rear wheel steering ratio characteristic is set to one of a plurality of rear wheel steering ratio characteristics irrespective of the road condition.

21. A four-wheel steering system for a vehicle as defined in claim 1 in which said means for sensing a vehicle condition senses vehicle speed.

22. A four-wheel steering system for a vehicle as defined in claim 1 in which said means for sensing a vehicle condition senses front wheel turning angle.

* * * * *